United States Patent
Ogura et al.

(10) Patent No.: US 9,815,142 B2
(45) Date of Patent: Nov. 14, 2017

(54) LASER WELDING APPARATUS AND LASER WELDING METHOD

(75) Inventors: Shuhei Ogura, Aichi-ken (JP); Atsushi Kawakita, Miyoshi (JP); Toshiki Yui, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 419 days.

(21) Appl. No.: 14/113,458

(22) PCT Filed: Apr. 20, 2012

(86) PCT No.: PCT/IB2012/000785
§ 371 (c)(1),
(2), (4) Date: Oct. 23, 2013

(87) PCT Pub. No.: WO2012/146965
PCT Pub. Date: Nov. 1, 2012

(65) Prior Publication Data
US 2014/0048518 A1    Feb. 20, 2014

(30) Foreign Application Priority Data

Apr. 26, 2011   (JP) ................. 2011-098801

(51) Int. Cl.
*B23K 26/20* (2014.01)
*B23K 26/00* (2014.01)
(Continued)

(52) U.S. Cl.
CPC ............ *B23K 26/20* (2013.01); *B23K 26/082* (2015.10); *B23K 26/22* (2013.01); *B23K 26/244* (2015.10)

(58) Field of Classification Search
CPC ........ B23K 26/00; B23K 26/08; B23K 26/20; B23K 26/34
(Continued)

(56) References Cited

U.S. PATENT DOCUMENTS 4,626,653 A     12/1986 Sciaky et al.
5,498,508 A *   3/1996 Chan .................. B23K 26/0608
                                                         219/121.6
(Continued)

FOREIGN PATENT DOCUMENTS

EP     0 130 100 A1    1/1985
JP     52114492        2/1951
(Continued)

OTHER PUBLICATIONS

Partial Translation of Communication in counterpart Japanese Patent Application No. 2011-098801.
(Continued)

*Primary Examiner* — Michael Laflame, Jr.
(74) *Attorney, Agent, or Firm* — Sughrue Mion, PLLC

(57) ABSTRACT

A laser welding apparatus generates laser by a laser oscillator, converges the laser by a condenser lens, and applies the laser to an upper sheet and a lower sheet superposed together so as to weld the upper sheet and the lower sheet to each other. According to this apparatus, by laser irradiation, a melt pool Y is formed in the upper sheet and the lower sheet superposed together. Furthermore, by laser irradiation, the melt pool Y is caused to flow, and the upper sheet and the lower sheet are welded together.

18 Claims, 9 Drawing Sheets

(51) Int. Cl.
*B23K 26/22* (2006.01)
*B23K 26/082* (2014.01)
*B23K 26/244* (2014.01)

(58) Field of Classification Search
USPC .............. 219/121.6, 121.61, 121.62, 121.63, 219/121.64, 121.65, 121.66, 121.75
See application file for complete search history.

(56) References Cited

U.S. PATENT DOCUMENTS

| | | | | |
|---|---|---|---|---|
| 6,040,550 | A * | 3/2000 | Chang | B23K 26/032 219/121.63 |
| 6,231,566 | B1 * | 5/2001 | Lai | A61F 9/00804 219/121.8 |
| 6,533,628 | B1 * | 3/2003 | Matsutani | H01T 21/02 219/121.64 |
| 6,914,213 | B2 | 7/2005 | Alips et al. | |
| 7,067,198 | B2 * | 6/2006 | Yamada | B23K 26/18 219/121.6 |
| 7,531,767 | B2 * | 5/2009 | Arai | B23K 26/03 219/121.61 |
| 2003/0089690 | A1 * | 5/2003 | Yamazaki | B23K 26/0823 219/121.66 |
| 2005/0063435 | A1 * | 3/2005 | Imai | G02B 27/0955 372/43.01 |
| 2005/0109740 | A1 | 5/2005 | Becker et al. | |
| 2006/0255019 | A1 * | 11/2006 | Martukanitz | B23K 26/0639 219/121.64 |
| 2006/0278618 | A1 * | 12/2006 | Forrest | B23K 26/0604 219/121.64 |
| 2008/0296271 | A1 * | 12/2008 | Klein | B23K 26/123 219/121.64 |
| 2009/0134132 | A1 * | 5/2009 | Verna | B23K 26/1441 219/121.64 |
| 2010/0047587 | A1 | 2/2010 | Itoh et al. | |
| 2010/0072178 | A1 | 3/2010 | Ramsayer | |
| 2010/0206857 | A1 * | 8/2010 | Bea | B23K 26/0734 219/121.64 |
| 2011/0165816 | A1 * | 7/2011 | Lee | B23K 26/0626 445/25 |

FOREIGN PATENT DOCUMENTS

| | | |
|---|---|---|
| JP | 6021190 A | 2/1985 |
| JP | 02006083 A | 1/1990 |
| JP | 06-099294 A | 4/1994 |
| JP | 10-71480 A | 3/1998 |
| JP | 10202387 A | 8/1998 |
| JP | 2004-025219 A | 1/2004 |
| JP | 2005504641 A | 2/2005 |
| JP | 2005-131707 A | 5/2005 |
| JP | 2006-110565 A | 4/2006 |
| JP | 2006-224134 A | 8/2006 |
| JP | 2007000888 A | 1/2007 |
| JP | 2008126298 A | 6/2008 |
| JP | 2010-023047 A | 2/2010 |
| JP | 2010517783 A | 5/2010 |
| JP | 2012-228716 A | 11/2012 |
| JP | 2012-228717 A | 11/2012 |
| KR | 1020050023271 A | 3/2005 |
| KR | 1020090073167 A | 7/2009 |
| WO | 2006/116722 A2 | 11/2006 |
| WO | 2009/021716 A1 | 2/2009 |

OTHER PUBLICATIONS

International Search Report for corresponding International Application No. PCT/IB2012/000785 dated Aug. 7, 2012.

* cited by examiner

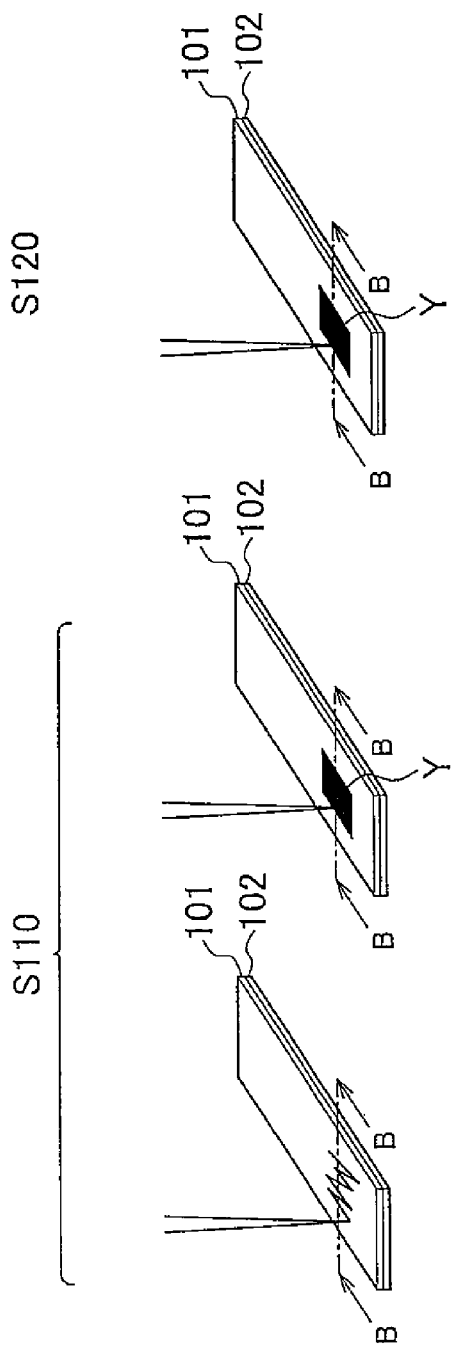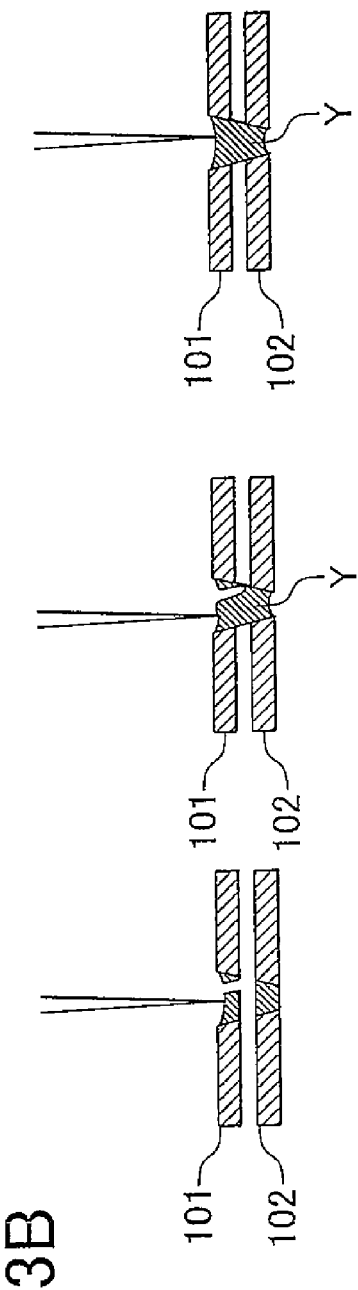

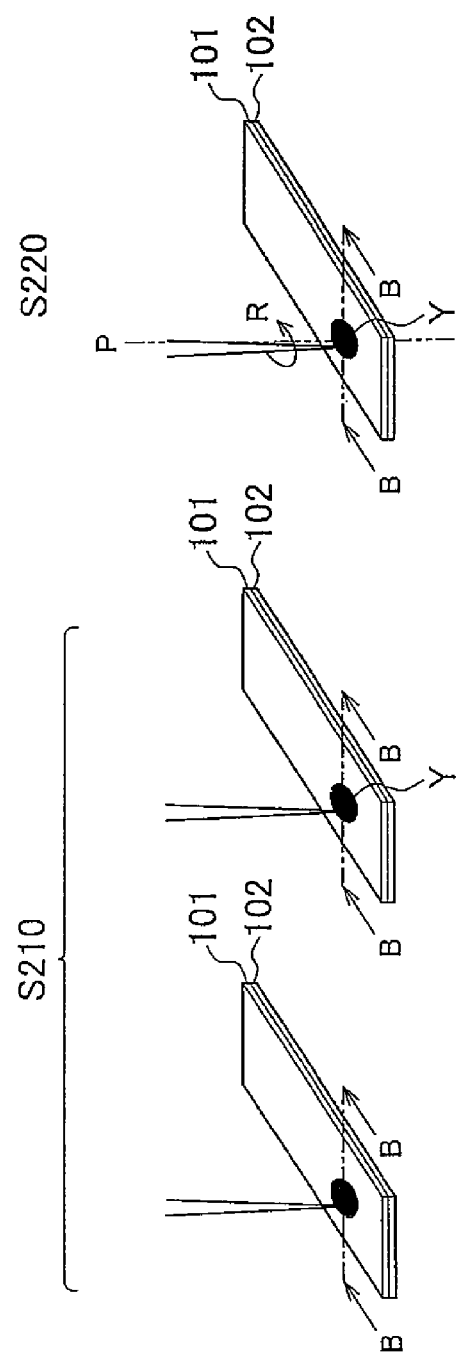
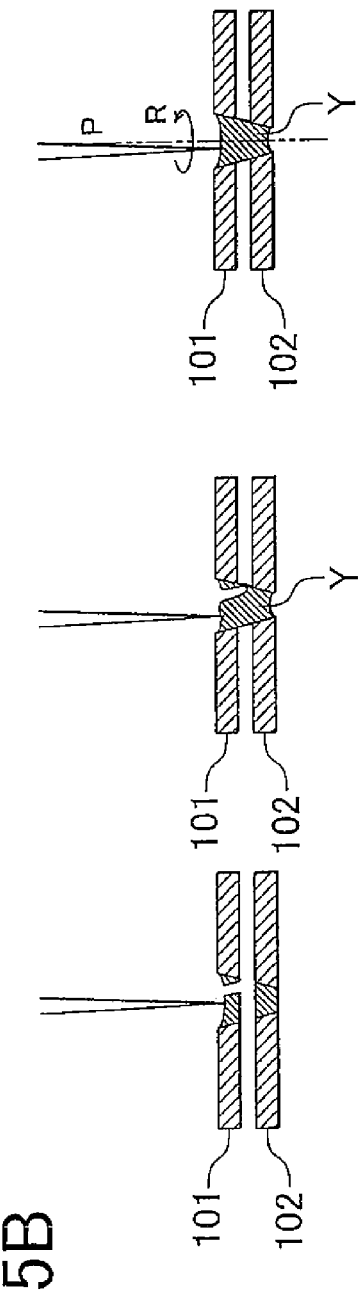
FIG. 5A
FIG. 5B

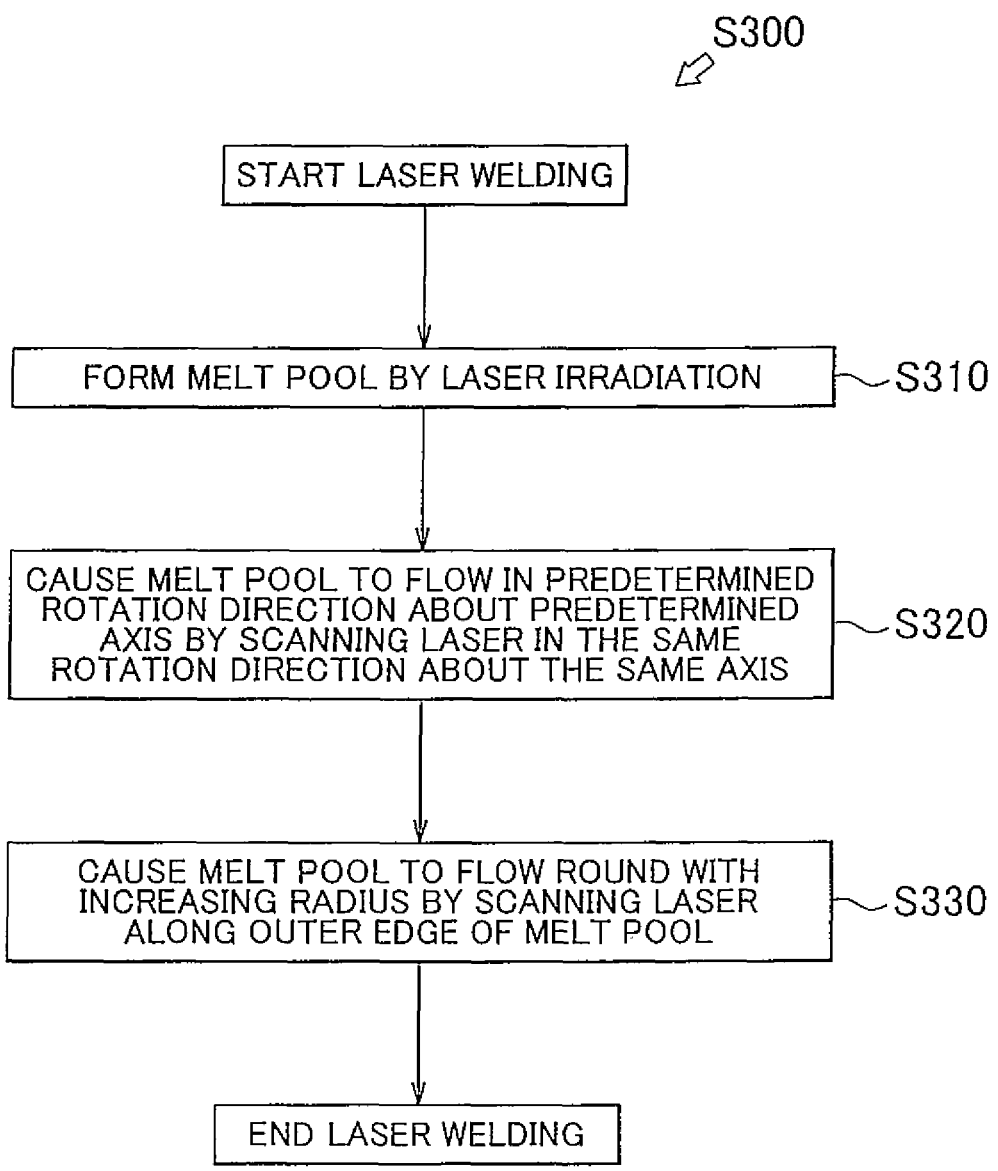

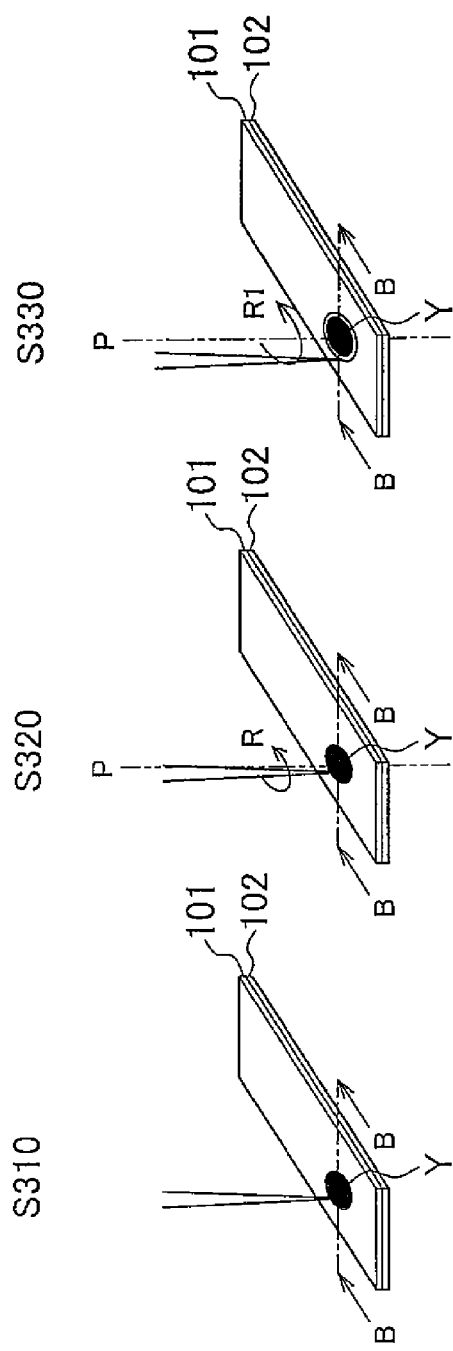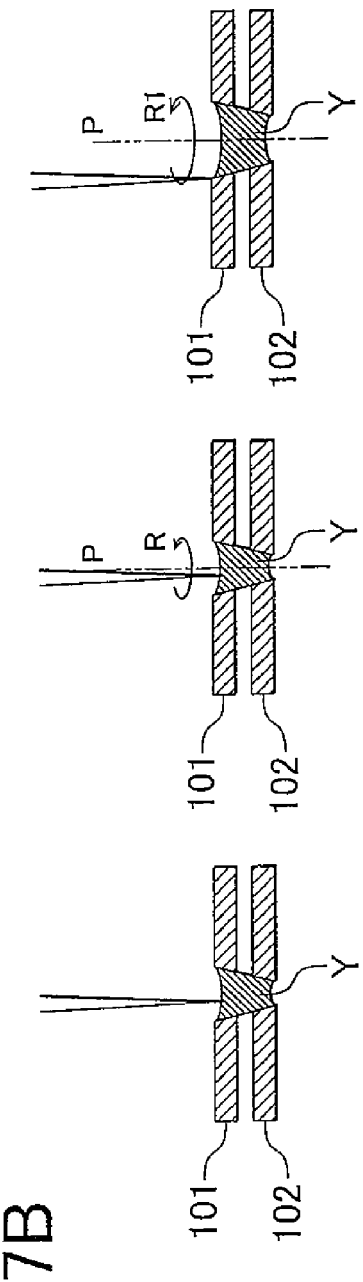

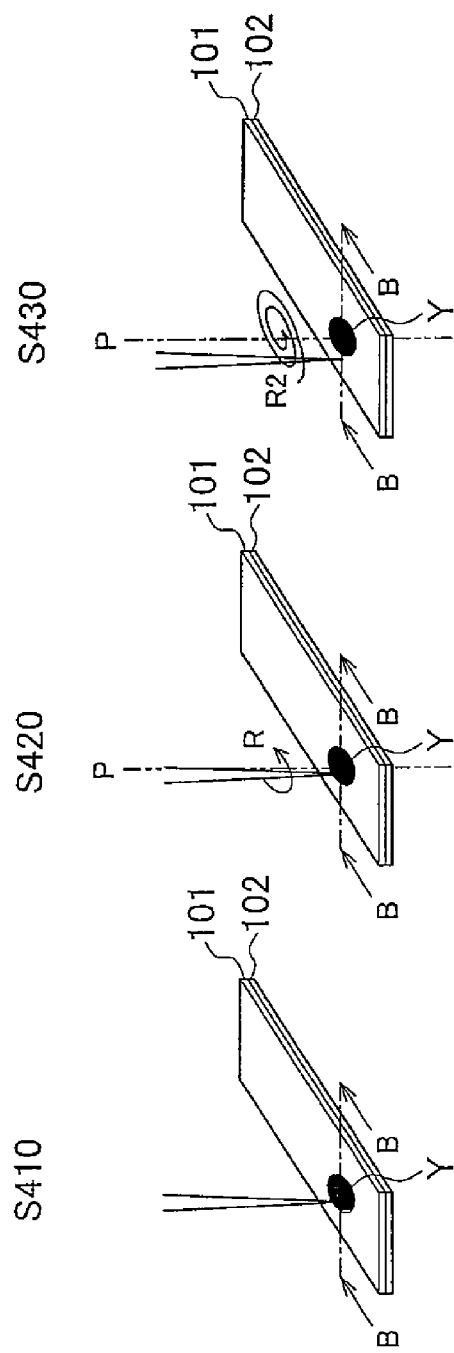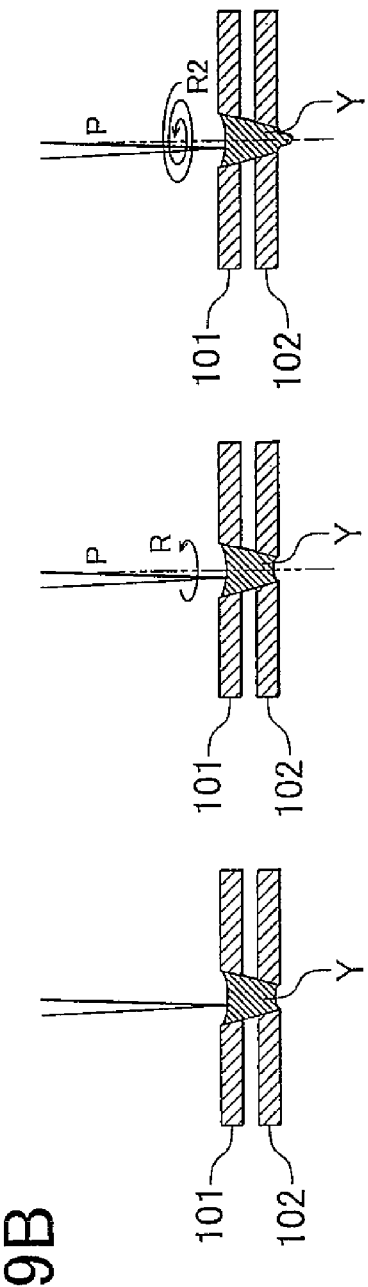

LASER WELDING APPARATUS AND LASER WELDING METHOD

BACKGROUND OF THE INVENTION

1. Field of the Invention

The invention relates to a technology concerning a laser welding apparatus and a laser welding method.

2. Description of Related Art

The laser welding is a welding method in which laser generated by a laser oscillator is converged by a condenser lens, and is applied to superposed steel sheets so as to weld the sheets. However, in the laser welding, the joint strength declines in the case where the sheet gap between steel sheets that are superposed together is large. For example, if there is an inter-sheet gap larger than or equal to 0.3 mm, the weld bead surface sometimes sinks, resulting in a reduced joint strength. Besides, if the inter-sheet gap is larger than 0.5 mm, it sometime happens that a penetration hole forms and the joint strength declines.

In the welding of a three-dimensional shape object, for example, a motor vehicle body, etc., it is difficult to properly control the inter-sheet gap to, for example, 0.3 mm or less. Meanwhile, an inter-sheet gap of about 1 mm is permitted practically, in the case of manufacturing of motor vehicle bodies and the like. Therefore, it has become an issue to weld steel sheets with an inter-sheet gap of about 1 mm without a decline in the joint strength. Now, some measures against the reduction of the joint strength of the laser welding of a large inter-sheet gap are taken in practice.

Japanese Patent Application Publication No. 2004-025219 (JP 2004-025219 A) discloses a method in which an inter-sheet gap is welded by using a shim roller. However, in the case where a motor vehicle body or the like is welded, two or three steel sheets are sometimes welded. Therefore, in the welding method disclosed by JP 2004-025219 A, there is a need to highly frequently carry out the replacement of shims or the like, and therefore the production efficiency declines.

Japanese Patent Application Publication No. 2005-131707 (JP 2005-131707 A) discloses a method in which laser tack welding is performed alternately with welding sites with the use of a clamp. However, in a method disclosed by JP 2005-131707 A, a dedicated large-size clamp is needed for the welding of a motor vehicle body or the like. Besides, in the welding method disclosed in the JP 2005-131707 A, when a zinc-plated steel is to be welded, the laser tack welding results in a welding failure caused by plating vapor blow.

In Japanese Patent Application Publication No. 2010-023047 (JP 2010-023047 A), the first laser irradiation is performed in a defocused state to melt the upper sheet so that a protrusion is formed toward the lower sheet side and therefore the gap is reduced, and then the second laser irradiation is performed to accomplish a penetrating weld. However, according to the welding method disclosed in the JP 2010-023047 A, since the first laser irradiation is low-energy irradiation, the first laser irradiation achieves the heat conduction melting in the upper sheet instead of the keyhole melting. Therefore, the processing time becomes long, and the productivity declines.

SUMMARY OF THE INVENTION

The invention provides a laser welding apparatus and a laser welding method capable of welding a plurality of sheets without a decline in the joint strength even in the case where there is a large inter-sheet gap.

A first aspect of the invention is a laser welding apparatus for welding a plurality of sheets superposed together, the laser welding apparatus including: a laser oscillator that generates laser; and a condenser lens that converges the laser, wherein the laser welding apparatus is configured to weld the plurality of sheets superposed together by applying the laser to the plurality of sheets superposed together so as to form a melt pool in the plurality of sheets, and applying the laser to the melt pool so that the melt pool flows.

In the first aspect of the invention, the laser welding apparatus may be configured to cause the melt pool to flow by scanning the laser applied to the melt pool, by driving the condenser lens.

In the first aspect of the invention, the laser welding apparatus may further include a jig that is drivable while holding the plurality of sheets, and the laser welding apparatus may be configured to cause the melt pool to flow by scanning the laser applied to the melt pool, by driving the jig.

In the first aspect of the invention, the laser welding apparatus may be configured to cause the melt pool to flow in a predetermined rotation direction about a predetermined axis that extends through the melt pool, by scanning the laser applied to the melt pool in the predetermined rotation direction about the predetermined axis.

In the first aspect of the invention, the laser welding apparatus may be configured to cause the melt pool to flow by scanning the laser in the predetermined rotation direction along an outer edge portion of the melt pool after the melt pool is caused to flow in the predetermined rotation direction about the predetermined axis.

In the first aspect of the invention, the laser welding apparatus may be configured to cause the melt pool to flow in the predetermined rotation direction about the predetermined axis that extends through the melt pool and converge toward the predetermined axis by scanning the laser in the predetermined rotation direction about the predetermined axis so that scanning converges to the predetermined axis.

A second aspect of the invention is a laser welding method, by which a plurality of sheets superposed together are welded, the laser welding method including: generating laser by a laser oscillator; converging the laser by a condenser lens; forming a melt pool in the plurality of sheets superposed together by applying the laser to the plurality of sheets; and causing the melt pool to flow by applying the laser to the melt pool.

In the second aspect of the invention, when the melt pool is caused to flow, the laser applied to the melt pool may be scanned by driving the condenser lens.

In the second aspect of the invention, when the melt pool is caused to flow, the laser applied to the melt pool may be scanned by driving a jig that holds the plurality of sheets.

In the second aspect of the invention, when the melt pool is caused to flow, the melt pool may be caused to flow in a predetermined rotation direction about a predetermined axis that extends through the melt pool by scanning the laser applied to the melt pool in the predetermined rotation direction about the predetermined axis.

In the second aspect of the invention, when the melt pool is caused to flow, the melt pool may be caused to flow and enlarge by scanning the laser in the predetermined rotation direction along an outer edge portion of the melt pool after causing the melt pool to flow in the predetermined rotation direction about the predetermined axis.

In the second aspect of the invention, when the melt pool is caused to flow, the melt pool may be caused to flow in the predetermined rotation direction about the predetermined axis so as to converge toward the predetermined axis by scanning the laser in the predetermined rotation direction about the predetermined axis so that scanning converges to the predetermined axis.

According to the laser welding apparatus and the laser welding method according to the invention, it is possible to weld a plurality of sheets without a decline in the joint strength, even if the inter-sheet gap is large.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A and 3B show schematic perspective views and their corresponding sectional views each taken along line B-B, respectively, showing operation of the welding method of the first embodiment;

FIGS. 5A and 5B show schematic perspective views and their corresponding sectional views each taken along line B-B, respectively, showing operation of the welding method of the second embodiment;

FIG. 6 is a flowchart showing a flow of a welding method in accordance with a third embodiment;

FIGS. 7A and 7B show schematic perspective views and their corresponding sectional views each taken along line B-B, respectively, showing operation of the welding method of the third embodiment;

FIGS. 9A and 9B show schematic perspective views and their corresponding sectional views each taken along line B-B, respectively, showing operation of the welding method of the fourth embodiment.

DETAILED DESCRIPTION OF EMBODIMENTS

Figure 1:
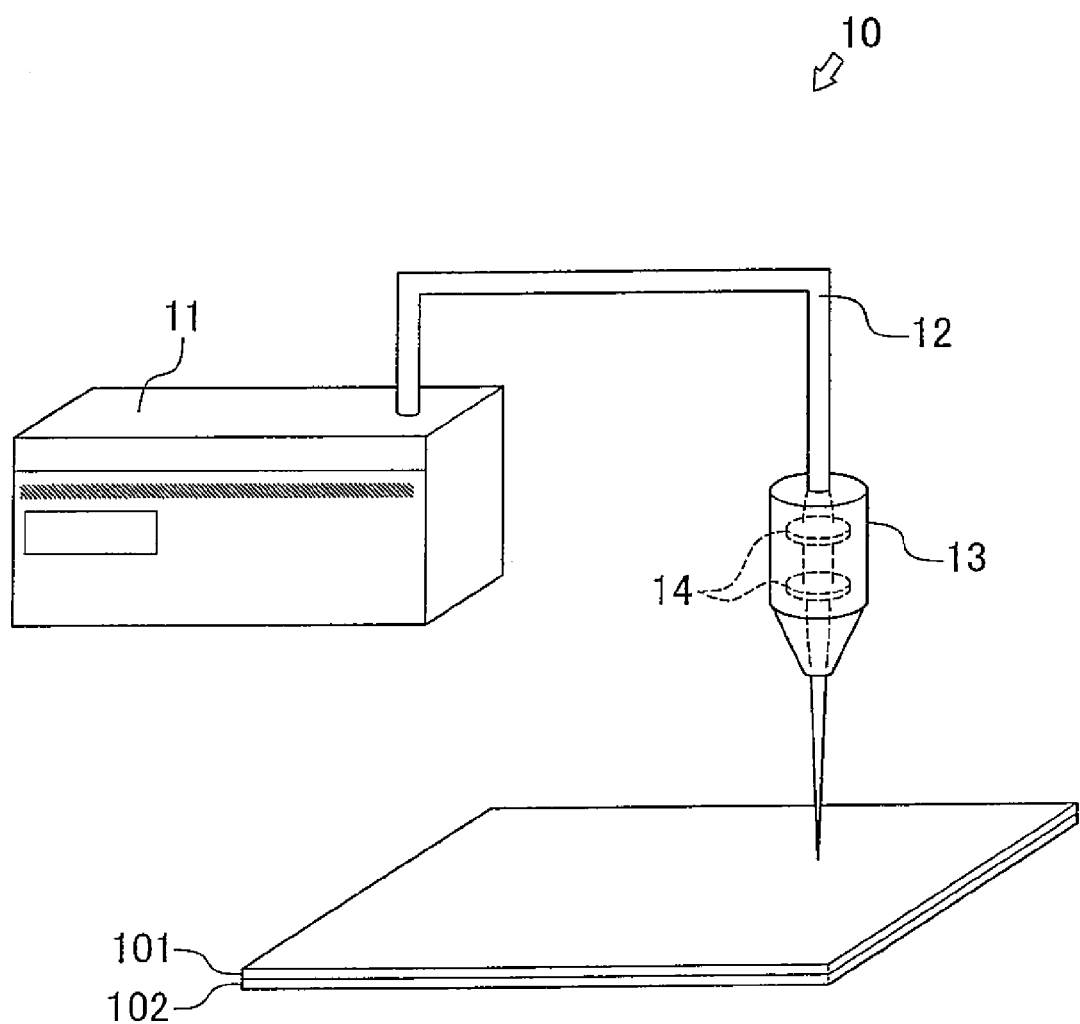
FIG. 1 is a construction diagram showing a construction of a laser welding apparatus in accordance with an embodiment of the invention.

With reference to FIG. 1, a laser welding apparatus 10 will be described. The laser welding apparatus 10 is an embodiment of the laser welding apparatus of the invention. The laser welding apparatus 10 is an apparatus that performs laser welding. The laser welding is a welding method in which while laser light is applied, as a heat source, to metal pieces while focused on the metal pieces so that the metal pieces are locally melted and solidified to join together.

In the embodiment described below, it is assumed that in order to construct a motor vehicle body, two superposed steel sheets, that is, an upper sheet 101 and a lower sheet 102, are welded together by the laser welding that uses the laser welding apparatus 10. It is also assumed that the upper sheet 101 and the lower sheet 102 superposed have an inter-sheet gap of 1 mm.

The construction of the laser welding apparatus 10 will be described. The laser welding apparatus 10 includes a laser oscillator 11, an optical path 12, a laser irradiation head 13, and condenser lenses 14. The laser oscillator 11 generates $CO_2$ laser or YAG laser as a welding heat source. The optical path 12 guides the laser generated by the oscillator to the laser irradiation head 13. The optical path 12 transmits the laser by bending it via mirrors, or transmits the laser by freely curving it through an optical fiber.

The laser irradiation head 13 applies the laser transmitted through the optical path 12, to the upper sheet 101 and the lower sheet 102 from above the upper sheet 101. The laser irradiation head 13 is moved to a position over the upper sheet 101 by a robot (not shown). The condenser lenses 14 condense the laser transmitted through the optical path 12 to an appropriate size for irradiation, and scans the laser on an object to be welded. The condenser lenses 14 are housed within the laser irradiation head 13.

Operation of the laser welding apparatus 10 will be described. The laser welding apparatus 10 generates laser by the laser oscillator 11, and converges the laser generated by the laser oscillator 11 through the use of the condenser lenses 14, and applies the laser converged by the condenser lenses 14 to the upper sheet 101 and the lower sheet 102 superposed together, and thus welds the upper sheet 101 and the lower sheet 102 together.

Figure 2:
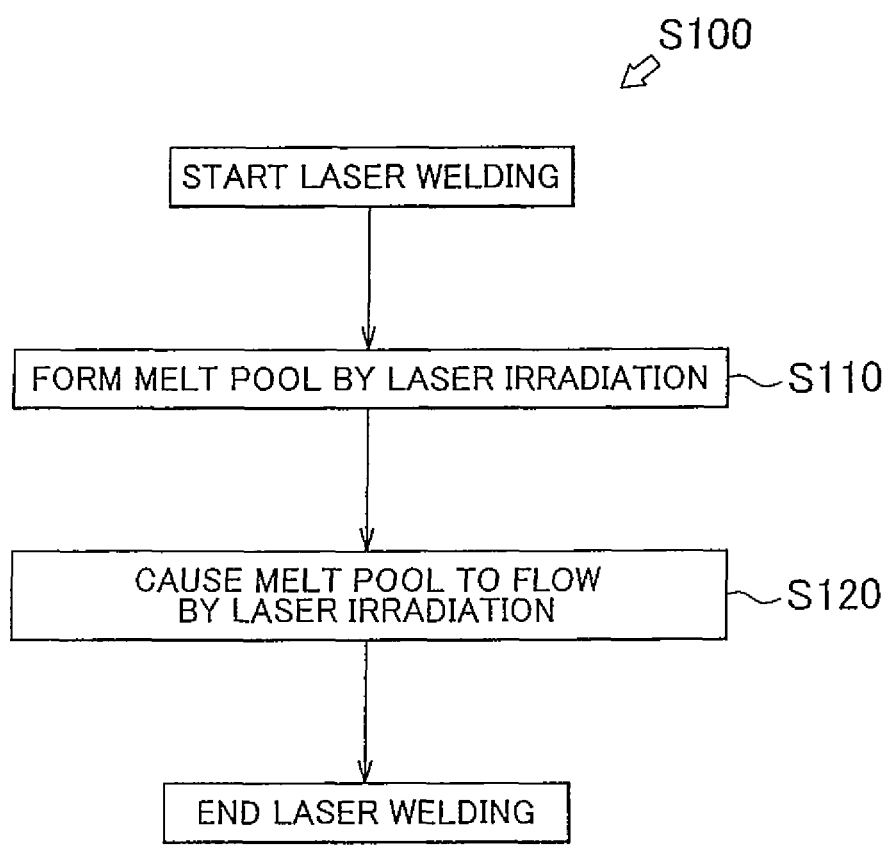
FIG. 2 is a flowchart showing a flow of a welding method in accordance with a first embodiment.

With reference to FIG. 2 and FIG. 3, a laser welding method S100 will be described. The laser welding method S100 is a first embodiment of the laser welding method that uses the laser welding apparatus of the invention. Incidentally, steps in FIG. 2 correspond to steps in FIGS. 3A and 3B. Besides, FIG. 3B shows sectional views each taken along line B-B in FIG. 3A.

With reference to FIG. 2, a flow of the laser welding method S100 will be described. In step S 110, the laser welding apparatus 10 applies a laser beam to the upper sheet 101 and the lower sheet 102 superposed together, from above the upper sheet 101. At this time, the laser welding apparatus 10 scans the applied laser beam so that a region occupied by the trace of irradiation with the laser beam forms a rectangular shape in a plan view, whereby a melt pool Y is formed in the upper sheet 101 and the lower sheet 102 superposed together. Incidentally, although in this embodiment, the trace of irradiation with laser forms a rectangular shape, the shape of the trace of irradiation may also be a different shape such as a circular shape, an elliptic shape, etc.

In step S120, the laser welding apparatus 10 applies a laser beam to the melt pool Y formed as described above, and scans the laser beam so that the trace of irradiation with the laser beam becomes a line bead, whereby an interior of the melt pool Y formed between the upper sheet 101 and the lower sheet 102 is caused to flow. Although the trace of irradiation with laser is a line bead in this case, any other trace of laser irradiation is appropriate as long as it is a trace of laser irradiation that causes the melt pool Y to flow.

With reference to FIG. 3, operation of the laser welding method S100 will be described. In step S110, the laser welding apparatus 10 applies a laser beam, from above, to the upper sheet 101 and the lower sheet 102 superposed together so that the melt pool Y is formed in the upper sheet 101 and the lower sheet 102 superposed together. In this case, it does not matter if a penetration hole or a separate bead forms in the formed melt pool Y.

In step S120, the scanning of laser irradiation by the laser welding apparatus 10 causes flow of the melt pool Y formed as described above. At this time, undulation occurs in the flowing melt pool Y. The melt pool Y in which undulation occurs is gathered due to surface tension, and forms a junction portion without a penetration hole nor a separate bead.

Effects of the laser welding method S100 will be described. In the field of the welding of a three-dimensional shape object, such as a motor vehicle body and the like, it has been difficult to properly manage the inter-sheet gap so that the inter-sheet gap is less than or equal to, for example, 0.3 mm. On the other hand, when a motor vehicle body or the like is to be manufactured, an inter-sheet gap of about 1 mm has been permitted in practice. Therefore, it has been an issue to perform welding with an inter-sheet gap of about 1 mm without decline in the joint strength. According to the laser welding method S100, the upper sheet 101 and the lower sheet 102 with an inter-sheet gap of 1 mm can be welded together without decline in the joint strength.

Figure 4:
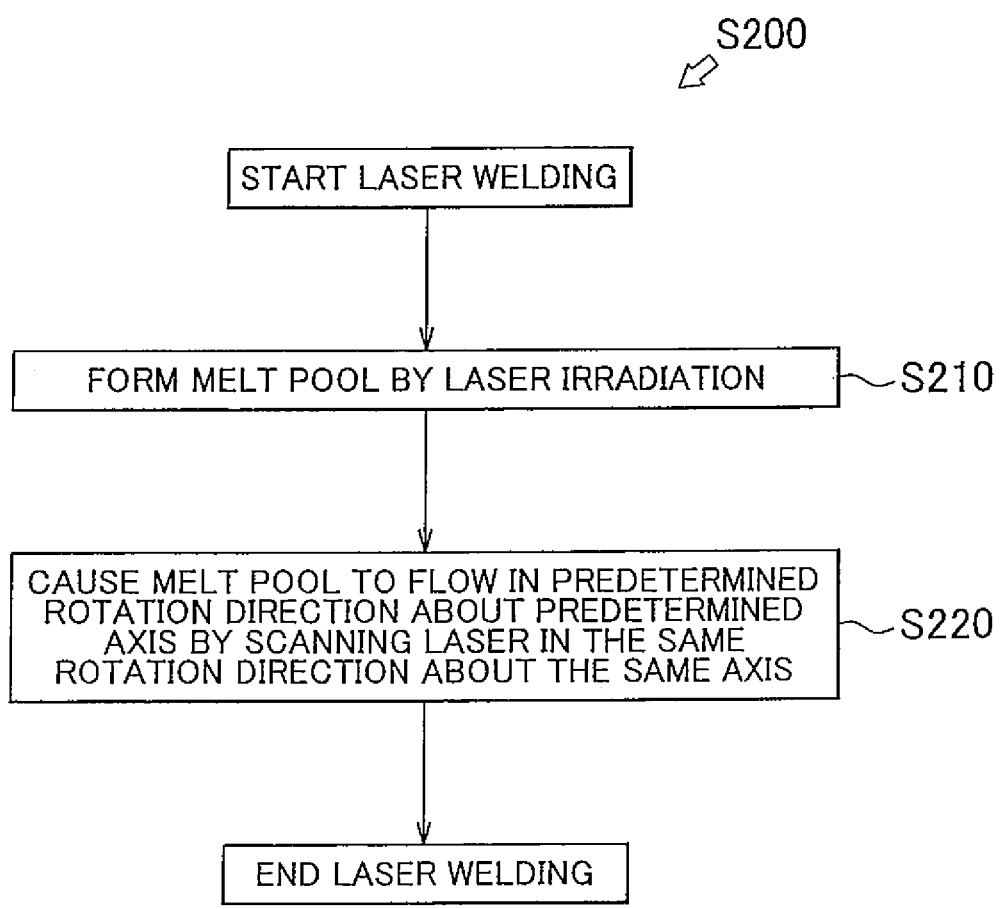
FIG. 4 is a flowchart showing a flow of a welding method in accordance with a second embodiment.

With reference to FIGS. 4, 5A, and 5B, a laser welding method S200 will be described. The laser welding method S200 is a second embodiment of the laser welding method that uses the laser welding apparatus of the invention. Incidentally, steps in FIG. 4 correspond to steps in FIGS. 5A and 5B. Besides, FIG. 5B shows sectional views each taken on line B-B in FIG. 5A.

With reference to FIG. 4, a flow of a laser welding method S200 will be described. In step S210, the laser welding apparatus 10, using the laser irradiation head 13, applies a laser beam to the upper sheet 101 and the lower sheet 102 superposed together, from above. At this time, the laser welding apparatus 10 scans the applied laser beam so that a region occupied by the trace of laser irradiation forms a circular shape in a plan view, whereby a melt pool Y is formed in the upper -sheet 101 and the lower sheet 102 superposed together. Incidentally, although in this embodiment, the trace of laser irradiation forms a circular shape, it suffices that the shape of the trace of laser irradiation is a concentric shape such as an elliptic shape, etc.

In step S220, the laser welding apparatus 10 scans the laser irradiation so as to cause flow in the melt pool Y formed in the upper sheet 101 and the lower sheet 102. Herein, an axis that extends in the vertical direction through a center of the melt pool Y in a plan view is defined as an axis P. In step S220, the laser irradiation is scanned so as to rotate in a predetermined direction about the axis P (the direction of an arrow R in FIGS. 5A and 5B).

With reference to FIGS. 5A and 5B, operation of the laser welding method S200 will be described. In step S210, the laser welding apparatus 10 applies a laser beam to the upper sheet 101 and the lower sheet 102 superposed together, from above, so that the melt pool Y that is circular in a plan view is formed between the upper sheet 101 and the lower sheet 102 superposed together. In this case, it does not matter if a penetration hole or a separate bead forms in the melt pool Y formed as described above.

In step S220, the scanning of the laser irradiation by the laser welding apparatus 10 causes rotation of the melt pool Y formed as described above. Specifically, the scanning of the laser irradiation by the laser welding-apparatus 10 causes the formed melt pool Y to circumferentially flow and be stirred. At this time, the melt pool Y that is turning flows in a circumferential direction, so as to be formed in a bowl or mortar shape. Simultaneously, undulation occurs in the flowing melt pool Y. The melt pool Y in which undulation occurs is gathered due to surface tension, and forms a junction portion without a penetration hole or a separate bead.

Effects of the laser welding method S200 will be described. According to the laser welding method S200, the upper sheet 101 and the lower sheet 102 that have an inter-sheet gap of 1 mm therebetween can be welded together without decline in the joint strength.

With reference to FIGS. 6, 7A, and 7B, a laser welding method S300 will be described. The laser welding method S300 is a third embodiment of the laser welding method that uses the laser welding apparatus of the invention. Incidentally, steps in FIG. 6 correspond to steps in FIGS. 7A and 7B. Besides, FIG. 7B shows sectional views each taken on line B-B in FIG. 7A.

With reference to FIG. 6, a flow of the laser welding method S300 will be described. The flow from step S310 to step S320 is substantially the same as the flow from step S210 to step S220 in the second embodiment, and therefore will not be described.

In step S330, the laser welding apparatus 10 scans the laser beam along an outer edge portion of the melt pool Y formed in a mortar shape in step S320. At this time, as in step S320, the scanning of the laser irradiation is performed so as to rotate in a predetermined direction (the direction of an arrow R1 in FIGS. 7A and 7B) about the axis P.

With reference to FIGS. 7A and 7B, operation of the laser welding method S300 will be described. The process of step S310 to step S320 operates in substantially the same manner as the process of step S210 to step S220 in the second embodiment, and will not be described again.

In step S330, the scanning of the laser irradiation by the laser welding apparatus 10 enlarges the diameter of the melt pool Y formed. At this time, the radial expansion of the melt pool Y is performed using as a base the melt pool Y that flows wholly as a mass in step S320, and therefore a penetration hole does not form in the melt pool Y. In the case where it is tried to form a radially expanded melt pool Y from the beginning, a melt pool Y with a large diameter is formed from the beginning, and therefore the probability of formation of a penetration hole is high. However, in step S330, the diameter of the melt pool Y is increased by using as a base the melt pool Y that flows wholly as a mass, and therefore the probability of formation of a penetration hole is low.

Effects of the laser welding method S300 will be described. According to the laser welding method S300, the upper sheet 101 and the lower sheet 102 with an inter-sheet gap of 1 mm can be welded together without decline in the joint strength.

Figure 8:
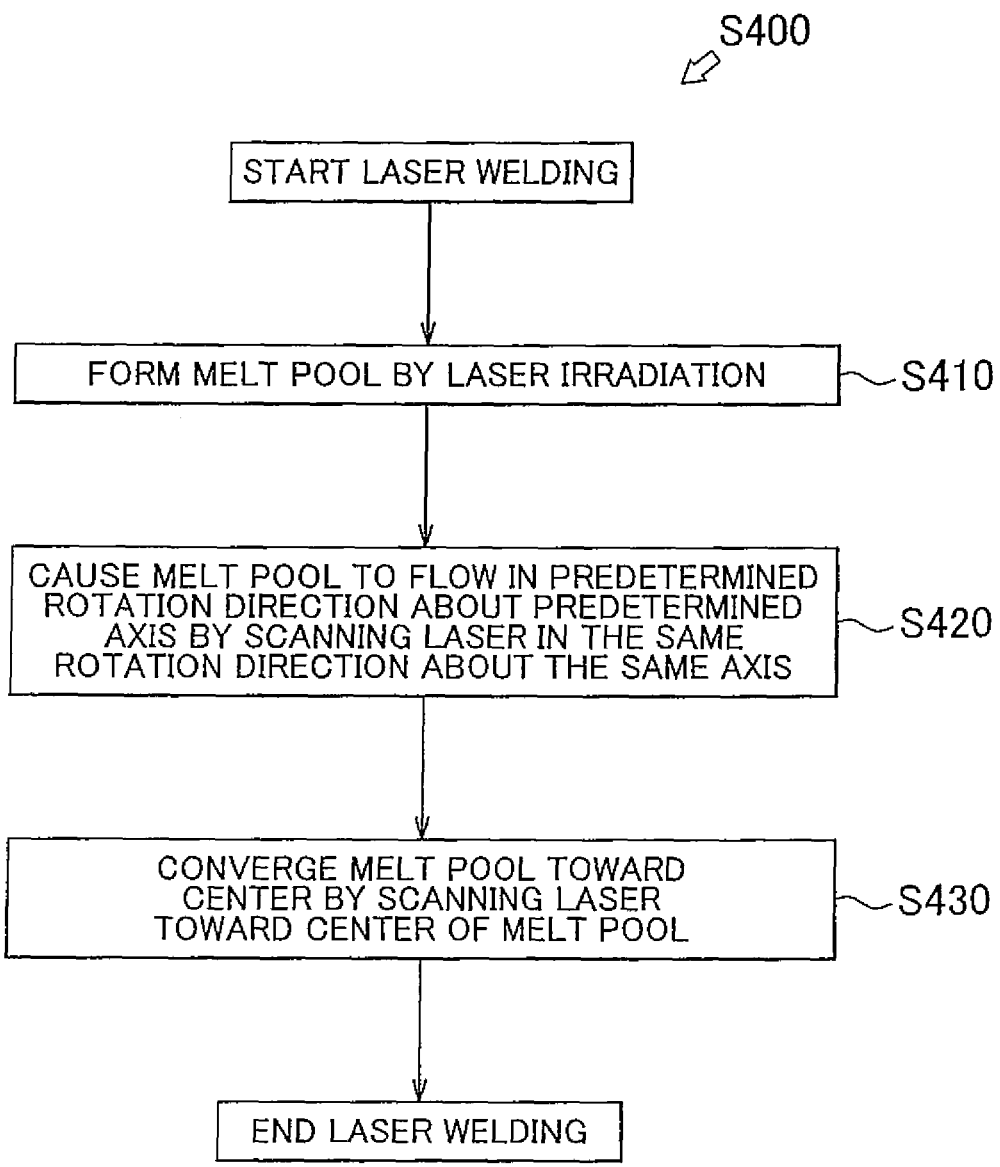
FIG. 8 is a flowchart showing a flow of a welding method in accordance with a fourth embodiment.

With reference to FIGS. 8, 9A, and 9B, a laser welding method S400 will be described. The laser welding method S400 is a fourth embodiment of the laser welding method that uses the laser welding apparatus of the invention. Incidentally, steps in FIG. 8 correspond to steps in FIGS. 9A and 9B. Besides, FIG. 9B shows sectional views each taken on line B-B in FIG. 9A.

With reference to FIG. 8, a flow of the laser welding method S400 will be described. The flow from step S410 to step S420 is substantially the same as the flow from step S210 to step S220 in the second embodiment, and therefore will not be described.

In step S430, the laser welding apparatus 10 scans the laser beam so that the scanning converges toward the center of the melt pool Y formed in a mortar shape in step S320. That is, the laser irradiation is scanned so as to converge toward the axis P. At this time, as in step S320, the scanning of the laser irradiation is performed so as to rotate in a predetermined direction (the direction of an arrow R2 in FIGS. 9A and 9B) about the axis P. In other words, the laser is scanned spirally about the axis P.

With reference to FIGS. 9A and 9B, operation of the laser welding method S400 will be described. The process of steps S410 to 5420 operates in substantially the same manner as the process of steps S210 to 5220 in the second embodiment, and will not be described below.

In step S430, the scanning of the laser irradiation by the laser welding apparatus 10 causes a central portion of the formed melt pool Y to extend downward. At this time, the melt pool Y flowing wholly as a mass in step S420 extends downward, so that the lower sheet 102 is welded with higher strength.

Effects of the laser welding method S400 will be described. According to the laser welding method S400, the upper sheet 101 and the lower sheet 102 that have an inter-sheet gap of 1 mm can be welded together without decline in the joint strength.

Although in the foregoing first to fourth embodiments, laser is applied from above the upper sheet 101 and the lower sheet 102 (two steel sheets) superposed together, the invention is not limited to this construction. Even in a construction in which laser is applied from above three or more steel sheets superposed together, substantially the same effects can be achieved.

Although in the first to fourth embodiments, the object to be welded is steel sheets, this does not limit the invention. For example, in a construction in which the object to be welded is aluminum sheets, substantially the same effects can be achieved.

Although in the first and fourth embodiments, laser is applied from above the upper sheet 101 and the lower sheet 102 superposed together, the invention is not limited to this. Even in a construction in which laser is applied to a side surface (end surface) of the upper sheet 101 and the lower sheet 102 superposed together, substantially the same effects can be achieved.

Incidentally, the scanning of laser may be carried out by changing the focusing position of laser through, for example, driving the condenser lens as in the foregoing embodiments, or may also be carried out by moving a plurality of sheets relatively to the laser through driving jigs (not shown) that hold the plurality of sheets. That is, it suffices that the laser and a plurality of sheets move relatively to each other so that a melt pool is caused to flow. However, in the case where a plurality of sheets to be welded are large so that it is hard to move the sheets, it is preferable to scan the laser by changing the focusing position of the laser through, for example, driving the condenser lenses.

Besides, examples of jigs for use in the invention include a clamp that clamps a plurality of sheets so that the sheets are fixed immovably relative to each other, a table on which a plurality of sheets are placed, combinations of these jigs, etc.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A laser welding apparatus for welding a plurality of sheets adjacent to each other, comprising:
a laser oscillator that generates a laser; and
a condenser lens that converges the laser,
wherein the laser welding apparatus is configured to weld the plurality of sheets together by applying the laser to a first side of a first sheet from among the plurality of sheets so as to form a melt pool which penetrates completely through the plurality of sheets, and applying the laser to the melt pool so that the melt pool flows,
wherein the laser welding apparatus is further configured to scan the laser on the melt pool so as to cause a circumferential flow of the melt pool and to cause undulation in the flowing melt pool thereby gathering the melt pool due to surface tension generated in the melt pool, and
wherein the undulation includes a portion of the melt pool extending away from the first sheet on a second side of the first sheet opposite the first side.

2. The laser welding apparatus according to claim 1, wherein
the laser welding apparatus is configured to cause the melt pool to flow by scanning the laser applied to the melt pool, by driving the condenser lens.

3. The laser welding apparatus according to claim 1, further comprising
a jig that is drivable while holding the plurality of sheets, wherein
the laser welding apparatus is configured to cause the melt pool to flow by scanning the laser applied to the melt pool, by driving the jig.

4. The laser welding apparatus according to claim 1, wherein
the laser welding apparatus is configured to cause the melt pool to flow in a predetermined rotation direction about a predetermined axis that extends through the melt pool, by scanning the laser applied to the melt pool in the predetermined rotation direction about the predetermined axis.

5. The laser welding apparatus according to claim 4, wherein
The laser welding apparatus is configured to cause the melt pool to flow and enlarge by scanning the laser in the predetermined rotation direction along an outer edge portion of the melt pool after the melt pool is caused to flow in the predetermined rotation direction about the predetermined axis.

6. The laser welding apparatus according to claim 4, wherein
the laser welding apparatus is configured to cause the melt pool to flow in the predetermined rotation direction about the predetermined axis that extends through the melt pool and converge toward the predetermined axis by scanning the laser in the predetermined rotation direction about the predetermined axis so that scanning converges to the predetermined axis.

7. A laser welding method, by which a plurality of sheets adjacent to each other are welded, comprising:
generating a laser by a laser oscillator;
converging the laser by a condenser lens;
forming a melt pool which penetrates completely through at least one of the plurality of sheets by applying the laser to a first side of a first sheet from among the plurality of sheets; and
causing the melt pool to flow by applying the laser to the melt pool,
wherein forming the melt pool includes scanning the laser on the melt pool so as to cause a circumferential flow of the melt pool and to cause undulation in the flowing melt pool thereby gathering the melt pool due to surface tension generated in the melt pool, and
wherein the forming the melt pool includes scanning the laser on the melt pool so as to cause a central portion of the melt pool on a second side of the first sheet opposite the first side to extend toward a melt pool on a second sheet from among the plurality of sheets.

8. The laser welding method according to claim 7, wherein
when the melt pool is caused to flow, the laser applied to the melt pool is scanned by driving the condenser lens.

9. The laser welding method according to claim 7, wherein
when the melt pool is caused to flow, the laser applied to the melt pool is scanned by driving a jig that holds the plurality of sheets.

10. The laser welding method according to claim 7, wherein
when the melt pool is caused to flow, the melt pool is caused to flow in a predetermined rotation direction about a predetermined axis that extends through the melt pool by scanning the laser applied to the melt pool in the predetermined rotation direction about the predetermined axis.

11. The laser welding method according to claim 10, wherein
when the melt pool is caused to flow, the melt pool is caused to flow and enlarge by scanning the laser in the predetermined rotation direction along an outer edge portion of the melt pool after causing the melt pool to flow in the predetermined rotation direction about the predetermined axis.

12. The laser welding method according to claim 10, wherein
when the melt pool is caused to flow, the melt pool is caused to flow in the predetermined rotation direction about the predetermined axis so as to converge toward the predetermined axis by scanning the laser in the predetermined rotation direction about the predetermined axis so that scanning converges to the predetermined axis.

13. The laser welding apparatus according to claim 1, wherein a gap is formed between the first sheet and the second sheet from among the plurality of sheets, and the laser welding apparatus is configured to apply the laser to the plurality of sheets so the melt pool extends into the gap.

14. The laser welding method according to claim 7, wherein a gap is formed between the first sheet and a second sheet from among the plurality of sheets, and wherein the laser is applied to the plurality of sheets so the melt pool extends into the gap.

15. The laser welding apparatus according to claim 13, wherein the gap is equal to or greater than 0.5 millimeters.

16. The laser welding apparatus according to claim 13, wherein the first sheet and the second sheet are consecutive sheets.

17. The laser welding method according to claim 14, wherein the gap is equal to or greater than 0.5 millimeters.

18. The laser welding method according to claim 14, wherein the first sheet and the second sheet are consecutive sheets.

* * * * *